Figure 1:
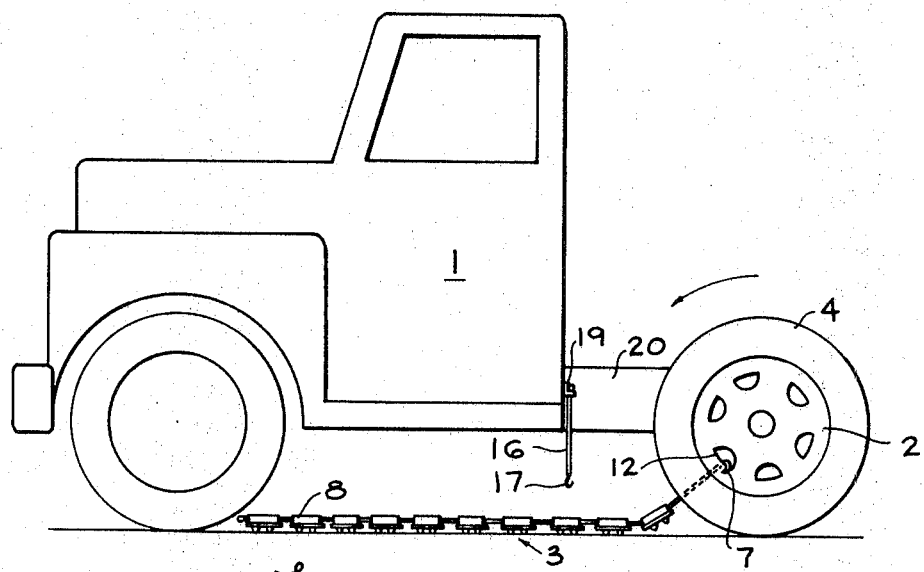

United States Patent

[11] 3,532,149

| [72] | Inventor | Jimmy C. McCord<br>Rte. 4, Box 20, Roanoke, Alabama 36274 |
|---|---|---|
| [21] | Appl. No. | 731,957 |
| [22] | Filed | May 24, 1968 |
| [45] | Patented | Oct. 6, 1970 |

[54] VEHICLE TRACTION DEVICE AND METHOD OF MOUNTING AND DISMOUNTING
5 Claims, 12 Drawing Figs.

[52] U.S. Cl. ............................................. 152/213
[51] Int. Cl. .......................................... B60c 27/06
[50] Field of Search .................................... 152/213—
218, 233

[56] References Cited
UNITED STATES PATENTS

| 1,472,511 | 10/1923 | Broomall | 152/213 |
| 1,766,634 | 6/1930 | Hill | 152/215 |
| 2,174,345 | 9/1939 | Wortling | 152/233 |
| 2,815,060 | 12/1957 | Hellman | 152/214 |
| 2,903,037 | 9/1959 | Palmer et al | 152/218 |

FOREIGN PATENTS

| 309,755 | 1/1956 | Switzerland | 152/213 |

*Primary Examiner*—James B. Marbert
*Attorney*—Walter M. Rodgers

ABSTRACT: A traction device utilizes a tension cable on which a plurality of traction blocks are threaded. A hook is secured to one end of the cable and during mounting of the device, the hook is placed between spaced vehicle tires forming a wheel of the vehicle and is interconnected with the wheel so that movement of the wheel over the traction device in effect wraps the device around the wheel. Dismounting is effected by simply interconnecting one end of a removal cable with the end of the traction device cable remote from the hook and by interconnecting the other end of the removal device with the hook end of the cable, the removal cable being trailed about an idler pulley. Thus, when the vehicle is operated in the direction opposite from that in which it is moved during mounting of the traction device, the traction device is simply pulled away from the vehicle tires. If desired a clamping device may be used to secure the traction means on the associated wheel.

The need for traction means may not become altogether apparent until the vehicle becomes mired in snow, mud or other low friction surfaces and after such a condition develops it is very difficult to mount a traction device on the driving wheels of the vehicle by known means.

Patented Oct. 6, 1970 3,532,149

Sheet 1 of 3

INVENTOR.
JIMMY C. McCORD
BY Walter M. Rodgers
ATTORNEY

INVENTOR.
JIMMY C. McCORD

Patented Oct. 6, 1970

3,532,149

Sheet 3 of 3

INVENTOR.
JIMMY C. McCORD
BY
Walter M. Rodgers

ATTORNEY

VEHICLE TRACTION DEVICE AND METHOD OF MOUNTING AND DISMOUNTING

According to this invention, an improved traction device constitutes elongated flexible traction means having a high friction tread surface and flange means for cooperating with the vehicle wheel, the flange means being effective to secure the traction means against substantial sidewise motion relative to the wheel but being ineffective to prevent peripheral movement of the traction means relative to the vehicle wheels, and disjointable coupling means secured to one end only of the traction means and arranged for disjointable connection with the vehicle wheel, turning motion of the wheel in one pulling direction being effective to impart tension to the traction means in a direction away from the coupling means.

To mount the traction means, it is first placed on the tread surface of the ground immediately adjacent a driving wheel of the vehicle and the end thereof adjacent to the wheel is fastened by disjointable coupling means to the wheel. Thereafter pulling motion of the wheels simply causes the wheels to ride up over the traction means. In order to dismount the traction means, the reverse procedure is followed by simply fastening the ends of a removal cable to the opposite ends of the traction means and by training the cable around an idler pulley. The vehicle is then operated in a direction opposite from that in which it is moved for mounting and the traction means is pulled off of the wheel.

Figure 2:
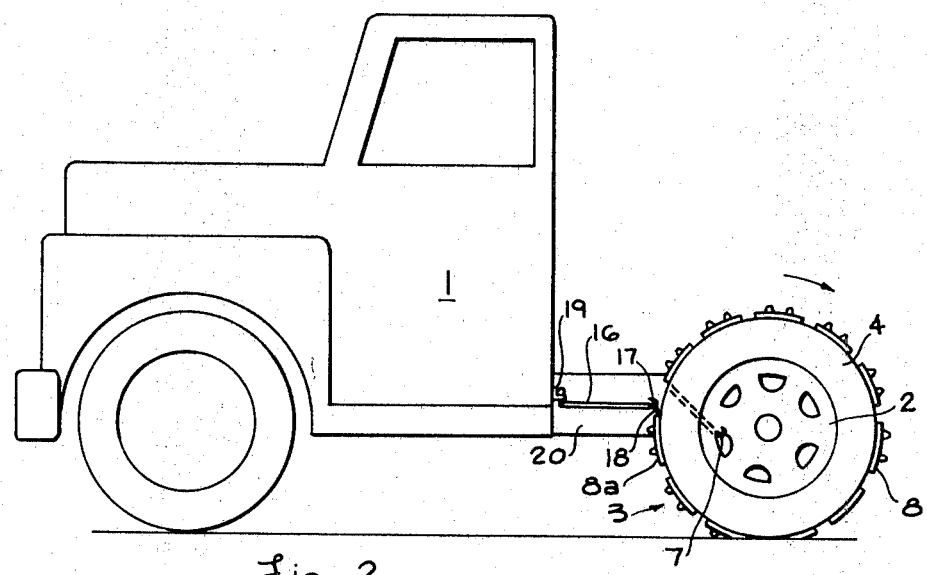
Figure 3:
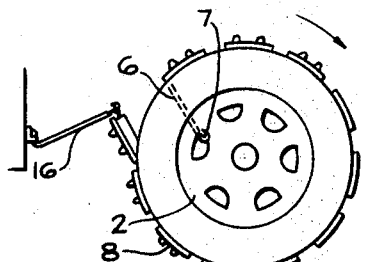
Figure 4:
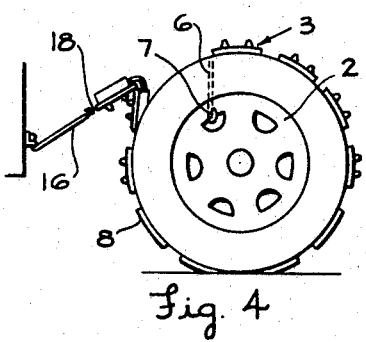
Figure 5:
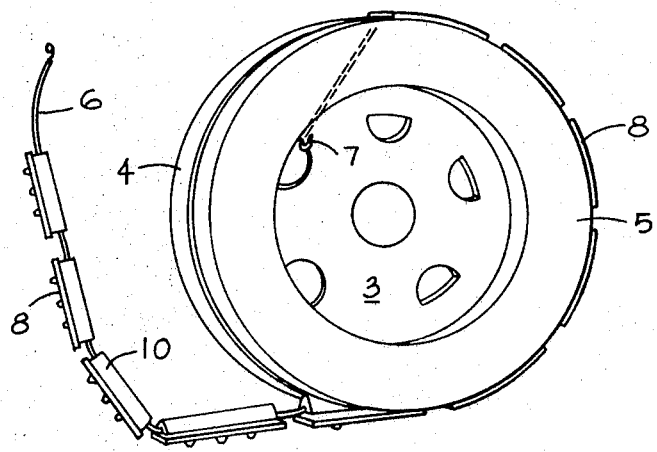
Figure 6:
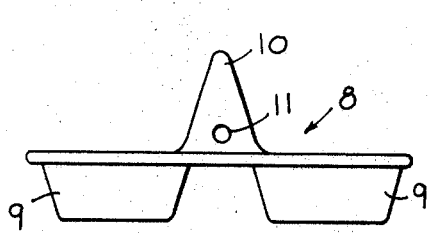
Figure 9:
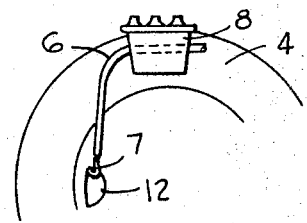
Figure 7:
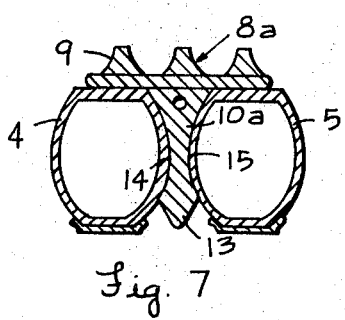
Figure 8:
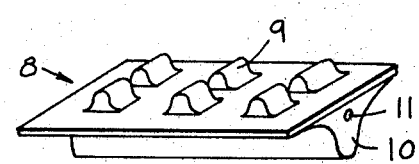
Figure 10:
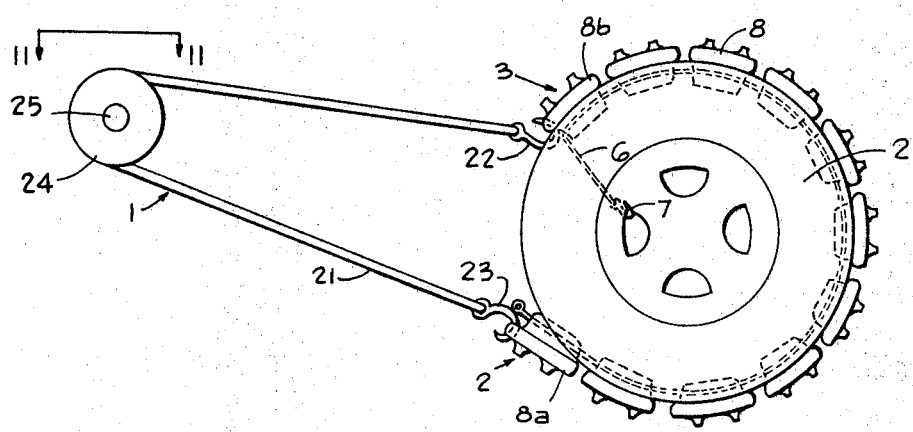
Figure 11:
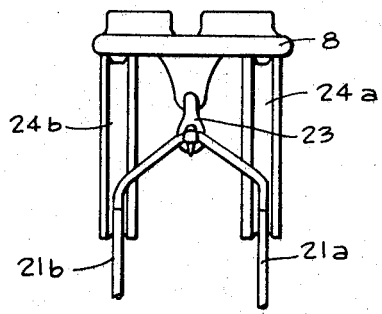
Figure 12:
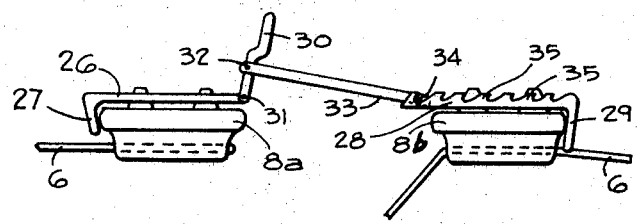

For a better understanding of the invention reference may be had to the following detailed description taken in conjunction with the accompanying drawings in which FIG. 1 is a schematic side view of a vehicle truck tractor together with the traction device shown in the position which it occupies at the beginning of a mounting operation; FIG. 2 is a view similar to FIG. 1 and showing the traction device in its fully mounted position; FIG. 3 is a view of a vehicle wheel together with one dismounting means for the traction means shown at the beginning stage of a dismounting operation; FIG. 4 is a view similar to FIG. 3 but showing the parts of the traction means in positions which they occupy during a subsequent phase of a dismounting operation; FIG. 5 is a perspective view of a vehicle wheel having dual tires and showing the traction means of this invention in relation to a vehicle wheel; FIG. 6 is an end view of a traction block such as may constitute a portion of the traction means of this invention; FIG. 7 is a cross-sectional view of the end traction block together with the associated dual tires and which is constructed according to a feature of the invention; FIG. 8 is a perspective view of the traction block shown in FIG. 6 but primarily showing the tread surface thereof; FIG. 9 is a fragmentary detailed view of a traction block together with disjointable coupling means of hook-like configuration which forms an interconnection with the vehicle wheel; FIG. 10 is a side view of an alternative removal arrangement from that depicted in FIGS. 3 and 4; FIG. 11 is an enlarged view taken approximately along the line 11–11 of FIG. 10 but showing the various elements during a removal operation, and in which FIG. 12 is a side view of a clamping device for holding the traction means securely on the associated wheel.

In the drawings the numeral 1 generally designates a vehicle and the numeral 2 designates a driving wheel thereof. The numeral 3 generally designates the elongated flexible traction means constructed according to this invention. Traction means 3 is mounted on the dual tires 4 and 5.

As is best shown in FIGS. 3, 4 and 5, the elongated traction device 3 of this invention comprises a flexible cable 6 to one end of which a disjointable coupling means in the form of a hook 7 is provided. A plurality of traction blocks 8 are threadedly mounted onto the flexible cables 6 and disposed in end-to-end closely spaced relation. As is best shown in FIG. 6, each traction block 8 on the tread surface thereof is provided with a plurality of cleats 9 which may be of conventional construction together with a flange 10 in which an opening 11 is formed. Thus, as is apparent particularly from FIG. 5 each block 8 is threadedly mounted by passing cable 6 through hole 11 and is arranged with its flange 10 disposed in the space between the tires 4 and 5. The surfaces of the blocks 8 which engage the tires are configured to conform substantially therewith.

In order to mount the traction means of this invention on the vehicle wheel, the traction means is first laid out as shown in FIG. 1 in front of the wheel 2. The coupling means in the form of hook 7 is inserted between the tires 4 and 5 and the hook 7 is fastened in an opening 12 in wheel 2. Of course if the wheel is provided with spokes or with other fastening means, the hook 7 could be interconnected with such other means.

After the traction means is arranged as shown in FIG. 1, the vehicle is simply driven in such manner as to cause the tires 4 and 5 to ride up over the traction means 3 so that after an approximately complete revolution of the wheel 2 in the counter-clockwise direction as viewed in FIG. 1, the traction device appears mounted substantially as shown in FIG. 2. It is apparent that forward driving motion of vehicle 1 which results from counter-clockwise rotation of wheel 2 tends to impart a tension force to the traction blocks 8 in a direction away from coupling means 7 and in this manner holds the traction means securely on the tires 4 and 5.

The fact that the cable 6 is disposed between the two parts of the dual wheel causes the flexible cable to wind about the hub between the two parts in a wrench-like fashion no matter what the length of cable 6 might be. Furthermore a balanced force is applied as the traction means is wrapped in place.

For the purpose of holding the traction block at the end of cable 6 which is remote from hook 7 in its service position, the flange 10a of the traction block 8a is provided with an enlarged end portion 13 which is somewhat greater than the normal spacing between the innermost portions 14 and 15 of tires 4 and 5. Thus the end of the traction means comprising traction block 8a is held in its service position by friction due to the enlarged structure 13 of flange 10a.

According to one feature of the invention, the traction means 3 may be dismounted by a removal cable as is depicted for example in FIG. 2 and designated by the numeral 16. Removal cable 16 is provided with a hook 17 which is inserted into an eyelet 18 formed in the end of cable 6 which is remote from the hook 7 and which is adjacent to the traction block 8a. Of course removal cable 16 is simply fixedly mounted at 19 to the frame 20 of the vehicle.

For purposes of dismounting the traction means, still another arrangement may be utilized according to another feature of the invention. This arrangement is depicted in FIGS. 10 and 11 and comprises a removal cable 21 which is provided at its ends with hooks 22 and 23 and which is arranged to be trained over an idler pulley 24 mounted on a shaft pin 25 affixed to the frame of the vehicle. As is best shown in FIG. 11 removal cable 21 is a dual cable constituting reaches 21a and 21b which are arranged to ride in spaced grooves 24a and 24b formed about the periphery of idler pulley 24 as is obvious from FIG. 11.

Thus in order to remove the traction means by the mechanism depicted in FIGS. 10 and 11, it is simply necessary to train the dual cable 21 about the idler pulley 24 and thereafter to secure the hook 22 to block 8b or with cable 6 adjacent the hook 7 and to interconnect the hook 23 with block 8b or with the other end of cable 6 as shown in FIGS. 10 and 11. Thereafter rotation of the vehicle wheel as depicted in FIG. 10 in a clockwise direction causes the pulley 24 to rotate in a clockwise direction and the traction means is simply trained about the pulley 24. After the traction blocks are removed from the tires 4 and 5, the whole device is easily dismounted and removed.

For some applications of the invention it may be desirable to clamp the end blocks together and thereby to enhance the security of the mounting arrangement. To this end the structure of FIG. 12 may be employed. For example, the clamp 26 having a gripping part 27 is shown gripped over block 8a and the clamp 28 having a gripping part 29 is disposed in gripping relation to the primary block 8b. To tighten the clamping means 26, 28 crank 30 is pivoted at 31 to clamp 26 and is interconnected at 32 with a link 33 having a pin 34 for engaging any of the hook-like projections 35 on clamp 28. Thus swinging movement of crank 30 in a counter-clockwise direction about pin 31 effectively locks the end blocks together. The clamping device is dismounted by reverse rotation of crank 30.

While particular embodiments of the invention have been shown and described, the invention is not limited thereto and it is intended in the appended claims to cover all such changes and modifications as fall within the true spirit and scope of the invention.

I claim:

1. A traction device for a vehicle having a dual wheel with spaced side by side parts and a common central hub, said device comprising elongated flexible traction means including a plurality of interconnected traction blocks each having a high friction tread surface and a central flange arranged for disposition between the parts of the wheel, and flexible coupling means secured to one end only of said traction means for forming a connection with the vehicle wheel, turning motion of the wheel in one pulling direction being effective to impart tension to said traction means in a direction away from said coupling means, the central flange of the end traction block remote from said coupling means having an enlarged end portion for securing the other end of said traction device to the wheel.

2. A traction device according to claim 1 wherein a removal cable is affixed directly to the vehicle frame and arranged to form a disjointable connection with the end of said traction means opposite to said one end whereby turning motion of the wheel in the direction opposite to said one pulling direction is effective to withdraw the enlarged end portion of the central flange of the end traction block remote from said coupling means from its service position between the two parts of the dual wheel.

3. A traction device according to claim 1 wherein each traction block is provided with laterally spaced cleats and wherein a pair of clamps are interposed between said cleats on the end ones of said traction blocks respectively and wherein said clamps are provided with gripping surfaces arranged to engage and grip a lateral edge of said end traction blocks and one of said clamps having a plurality of projections, a crank pivotally mounted on one of said end traction blocks and a link pivotally connected with said crank and arranged to engage one of said projections on said one clamp, swinging movement of said crank into engagement with its associated traction block being effective to tighten and hold the device in its service position.

4. A traction device according to claim 1 wherein an idler pulley is rotatably mounted on the vehicle frame in fixed relation to the vehicle wheel and wherein removal cable means is interconnected at its ends with the ends of said traction means respectively, said cable being arranged to ride over said pulley during turning motion of the wheel in a direction opposite to said one pulling direction so as to remove said traction means from the vehicle wheel.

5. A traction device for a vehicle having a dual wheel with spaced side by side parts and a common central hub, said device comprising elongated flexible traction means including a plurality of interconnected traction blocks each having a high friction tread surface and a central flange arranged for disposition between the parts of the wheel, and flexible coupling means secured to one end only of said traction means and disposed between the two parts of said wheel and disjointably secured thereto, turning motion of the wheel in one pulling direction being effective to impart tension to said traction means in a direction away from said coupling means, and to wind said coupling means about at least a part of said central hub.